US011722056B2

(12) United States Patent
Yelamos Ruiz

(10) Patent No.: US 11,722,056 B2
(45) Date of Patent: Aug. 8, 2023

(54) POWER CONVERTER CONTROL AND PARAMETER SAMPLING

(71) Applicant: Infineon Technologies Austria AG, Villach (AT)

(72) Inventor: Pablo Yelamos Ruiz, Hermosa Beach, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/990,360

(22) Filed: Aug. 11, 2020

(65) Prior Publication Data

US 2022/0052603 A1 Feb. 17, 2022

(51) Int. Cl.
*H02M 1/00* (2006.01)
*H02M 1/42* (2007.01)

(52) U.S. Cl.
CPC ........... *H02M 1/42* (2013.01); *H02M 1/0029* (2021.05); *H02M 1/0025* (2021.05)

(58) Field of Classification Search
CPC ............ H02M 1/0003; H02M 1/0006; H02M 1/0009; H02M 1/0016; H02M 1/0019; H02M 1/0025; H02M 1/0029; H02M 1/0038; H02M 1/0041; H02M 1/08; H02M 1/081; H02M 1/082; H02M 1/14; H02M 1/143; H02M 1/36; H02M 1/42; H02M 1/44; H02M 3/02; H02M 3/04; H02M 3/06; H02M 3/07; H02M 3/073; H02M 3/135; H02M 3/137; H02M 3/155; H02M 3/156; H02M 3/1566; H02M 3/157; H02M 3/158; H02M 3/1584; H02M 3/1586; H02M 7/42; H02M 7/44; H02M 7/4815; H02M 7/493; H02M 7/515; H02M 7/521; H02M 7/525;
(Continued)

(56) References Cited

U.S. PATENT DOCUMENTS 4,524,412 A * 6/1985 Eng .................... H02M 3/3387
323/285
8,305,053 B2 * 11/2012 Truong ................ H02M 3/158
323/224
(Continued)

FOREIGN PATENT DOCUMENTS

DE 10302602 A1 8/2003
DE 102019125753 A1 3/2020

OTHER PUBLICATIONS

Extended Search Report, EP 21 19 0614, dated Dec. 21, 2021, pp. 1-8.

*Primary Examiner* — Thienvu V Tran
*Assistant Examiner* — Carlos O Rivera-Perez
(74) *Attorney, Agent, or Firm* — Armis IP Law, LLC

(57) ABSTRACT

An apparatus includes a controller. The controller receives feedback associated with a device powered by a power source. Sampling of the feedback associated with the device is susceptible to noise caused by a power converter in a vicinity of the controller. To achieve more accurate sampling of the feedback, the controller adjusts operation of the power converter during a window of time in which the power source powers the device. The adjusted operation reduces noise caused by the power converter such that, during the window of time in which the operation of the power converter is adjusted, the controller derives one or more accurate sample values from the received feedback.

31 Claims, 12 Drawing Sheets

(58) Field of Classification Search
CPC ........ H02M 7/527; H02M 7/529; H02M 7/53; H02M 7/537; H02M 7/5381
USPC ................ 363/13, 106, 108, 109, 123, 124; 323/222–224, 266, 271–275, 277, 323/281–285, 289, 351; 327/108, 109, 327/170, 379–391
See application file for complete search history.

(56) References Cited

U.S. PATENT DOCUMENTS

| | | | |
|---|---|---|---|
| 2006/0038547 A1* | 2/2006 | Ahmad | H02M 1/08 323/284 |
| 2009/0310385 A1* | 12/2009 | Maksimovic | H02M 3/157 363/21.1 |
| 2015/0365087 A1* | 12/2015 | Vogt | H03K 17/687 327/109 |
| 2018/0019671 A1* | 1/2018 | Li | H02M 3/156 |
| 2019/0115823 A1* | 4/2019 | Lidsky | H02M 3/158 |
| 2020/0036289 A1 | 1/2020 | Nagashima | |
| 2020/0195121 A1* | 6/2020 | Keskar | H02M 1/08 |

* cited by examiner

POWER CONVERTER CONTROL AND PARAMETER SAMPLING

BACKGROUND

There are multiple types of switching power converters. For example, one type of conventional power converter is a buck converter. In general, to maintain an output voltage within a desired range, a controller in the buck converter compares the magnitude of a generated output voltage to a setpoint reference voltage. Based on a respective error voltage, the controller modifies a respective switching frequency and/or pulse width modulation associated with activating high side switch circuitry or low side switch circuitry in the buck converter.

Another type of conventional power converter is a charge pump. In general, charge pumps use some form of switching a respective device to control the connection of a supply voltage across a load through a capacitor. In a two stage cycle charge pump, a respective first stage includes a capacitor that is connected across the supply, charging it to a respective voltage. A second stage of the charge pump couples the capacitor in series with the supply and the load. This doubles the voltage applied to the load. For example, via proper switching, the output voltage of the charge pump is the sum of the original supply and the multiple capacitor voltages.

Any type of power converter that converts an input voltage into output voltage output signal susceptible to substantial noise due to the power converter switching control. Typically, power converter switching results in abrupt changes in current delivery, resulting in substantial and unwanted noise.

BRIEF DESCRIPTION

This disclosure includes the observation that conventional power supply monitoring and control techniques suffer from deficiencies. For example, it is often difficult but desirable to more precisely sense a magnitude of sensor signal such as an output current delivered by a respective power converter to a load in order to generate appropriate control signals. In certain instances, the source of noise coupled into high sensitivity sensing is a power converter that performs high frequency switching. In general, high SR (Slew Rates), meaning high dI/dt and dV/dt of power supply switching current lead to spikes in respective system feedback signals, affecting overall control of a respective device.

Embodiments herein include novel ways of improving an accuracy of sampling feedback that is susceptible to noise from one or more noise sources such as one or more power converters.

More specifically, embodiments herein include an apparatus and/or system including a controller. The controller is operative to receive feedback associated with a device powered by a power source. Derivation of a sample from the feedback is susceptible to errors for any number of reasons. For example, noise from a power converter in nearby proximity may couple onto the feedback signal itself, a monitor that samples the feedback may be susceptible to noise from the nearby power converter, etc. In furtherance of reducing noise associated with monitoring the feedback, the controller as described herein adjusts operation of the power converter during a window of time in which the power source powers the device. The adjusted operation of the power converter during the window of time temporarily reduces noise caused by the power converter even though the power converter still provides power such as to control and/or power the device. During the window of time in which the operation of the power converter is adjusted to reduce noise, the controller (or corresponding, monitor, sampler, etc., associated with the controller) derives or produces a sample value from the feedback signal.

In accordance with further example embodiments, the feedback (such as a feedback signal) indicates a magnitude of current supplied by the power source to the device. The controller adjusts the operation of the power converter to produce a more accurate one or more samples of the magnitude of current supplied by the power source to the load. In one embodiment, the controller is powered by one or more output voltages received (supplied) from the power converter (one or more power converters).

The controller can be configured to adjust operation of the power converter in any suitable manner. For example, in one embodiment, the power converter is a switching power supply. The controller generates a control signal to control the power converter. In one embodiment, the control signal indicates to temporarily discontinue switching operation of the power converter during the window of time. The feedback from the device indicates an amount of current supplied by the power source to the device (such as motor, circuit, etc.). In one embodiment, the power converter supplies power to a switch driver controlled by the controller. Via controlling operation of the switch driver, the controller controls delivery of the current from the power source to the device via one or more switches driven by the switch driver.

In yet further example embodiments, the temporary adjustment of the power converter during the window of time (when sampling takes place) reduces an amount of the noise in the sample value caused by the power converter.

In still further example embodiments, the controller communicates a control signal to the power converter; the control signal indicating to temporarily modify a switching frequency of the power conversion during the window of time. In one embodiment, modification of the switching frequency at least temporarily reduces an amount of noise originating from the power converter during a respective sample window of time in which the feedback is converted into one or more accurate sample values.

Further embodiments herein include, via the controller, during the window of time, controlling a slew rate of switch control signals used to perform power conversion via the power converter.

In still further example embodiments, the controller temporarily adjusts a setpoint regulation voltage of the power converter. For example, in one embodiment, the controller increases a magnitude of a regulation reference setpoint voltage of the power converter prior to operating a sampler/monitor that derives one or more sample values from the feedback. The increased magnitude of the regulation reference setpoint voltage temporarily increases a corresponding magnitude of an output voltage produced by the power converter in an anticipation that the power converter will be temporarily deactivated during the window of time but must still provide output power via the output voltage. For example, in one embodiment, the controller generates a control signal. The control signal controls the power converter during the window of time and causes the power converter to temporarily discontinue power conversion/switching operations after increasing the regulation setpoint voltage. The temporary cessation of the switching and corresponding power conversion via the power converter reduces the effect of noise originated by the power converter on the feedback.

Further embodiments herein include operation of the power converter outside the window of time. In such an instance, the operation of the power converter and corresponding switching introduces noise in the feedback associated with the device. As previously discussed, the adjusted operation of the power converter and respective power conversion during the window of time reduces presence of the noise in the feedback.

Still further example embodiments herein include, via the controller, producing a switch control signal to control a respective switch, a state of the switch controls delivery of the current from the power source to the device. In one embodiment, the switch control signal itself is used to determine the window of time in which to adjust the operation of the power converter.

As previously discussed, embodiments herein are useful over conventional techniques. For example, embodiments herein include adjusting operation of a respective power converter in any of multiple different ways to at least temporarily reduce noise originating from the power converter. The reduction in noise enables a respective monitor/sampler to obtain a more accurate reading of one or more sample values generated from received feedback. For example, embodiments herein include selective disabling or altering of the switching of the noise source (converter clock and respective power converter, for example) in a way that when the sensing and sampling circuitry is implemented, the feedback signal is clean. However, the power conversion is selectively adjusted such that the power converter generally performs the desired function of providing power but provides a window of reduced noise from the power converter to generate one or more noise free samples.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: receive feedback associated with a device powered by a power source; adjust operation of a power converter during a window of time in which the power source powers the device, the adjusted operation reducing noise caused by the power converter; and during the window of time in which the operation of the power converter is adjusted, derive a sample value from the feedback.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
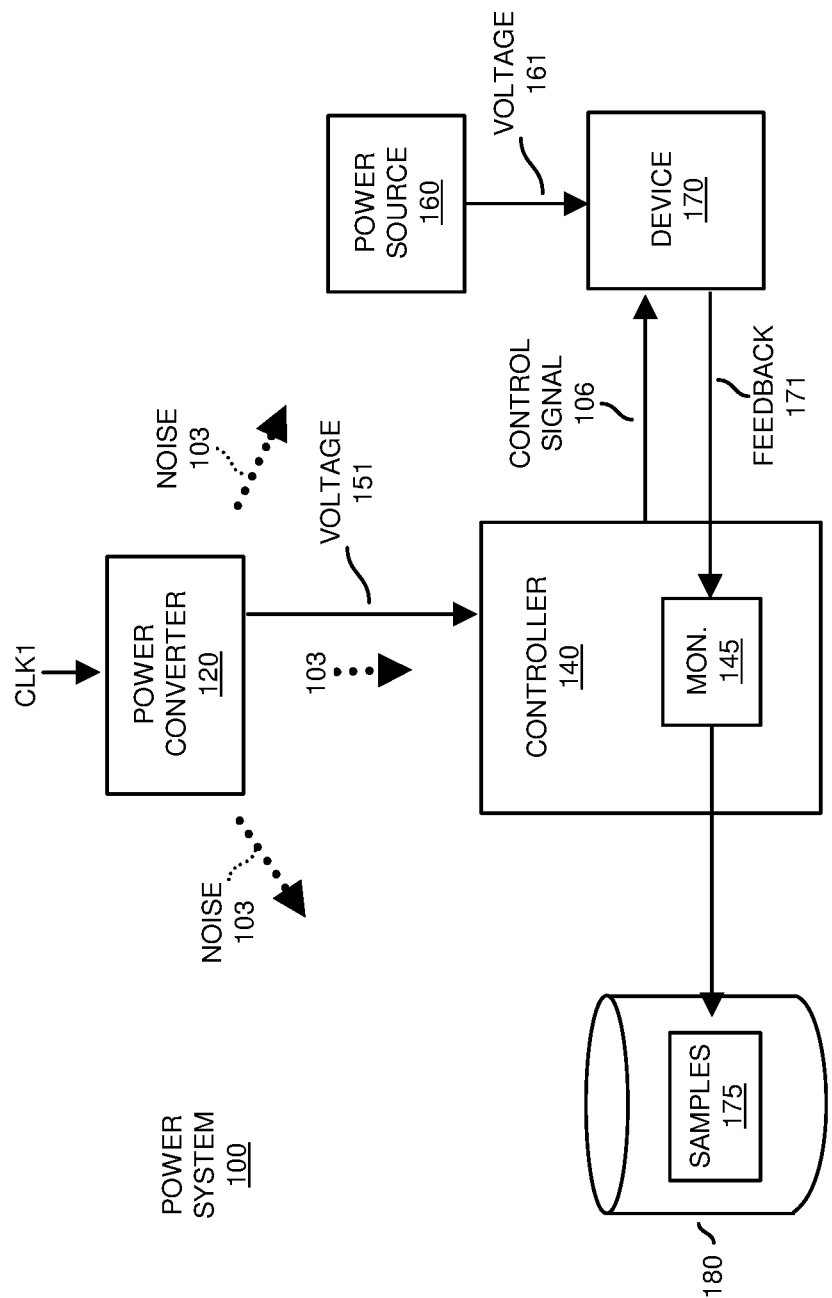
FIG. 1 is an example general diagram of a power system supporting power control and feedback monitoring according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In certain instances, power converters such as buck converter, charge pumps, etc., are integrated with highly sensitive circuits like operation amplifiers, comparators, ADC (Analog to Digital Converters), etc., that are used for sampling feedback voltages. This disclosure includes the observation that power converters or other mid to high frequency switching circuits can induce or couple high unacceptable amounts of switching noise into high precision sensing circuits.

As an example, in a device where a buck converter is integrated with a current sense amplifier, the buck switching can negatively affect the current sense amplifier in its ability to accurately sense a flow of current or another monitored parameter. Embodiments herein include ensuring that high precision analog parameter sensing and sampling is possible in integrated systems including noisy circuitry such as one or more power converter.

One embodiment herein includes a controller. The controller receives feedback associated with a device powered by a power source. Sampling of the feedback is susceptible to noise originating from a power converter. To achieve more accurate sampling of the feedback, the controller adjusts operation of the power converter during a window of time in which the power source powers the device. Adjustment of the power converter can include any suitable operation such as discontinued switching of the power converter, reduced switching of the power converter, etc. The adjusted operation of the power converter reduces noise originating from the power converter such that, during the window of time in which the operation of the power converter is adjusted, a corresponding monitor (sampler) of the controller derives a more accurate sample value from received feedback.

Now, more specifically, FIG. 1 is an example general diagram of a power system supporting power generation control and feedback monitoring according to embodiments herein.

In this example embodiment, the power system of FIG. 1 includes a controller 140 and corresponding monitor 145, power converter 120 (one or more power converters or noise generating circuits), repository 180, power source 160, and device 170.

During operation, the power converter 120 (i.e., any noise generating circuit) receives clock signal CLK1. As its name suggests, the power converter 120 (such as one or more power conversion circuits) converts one or more input voltages to one or more output voltages. In this example embodiment, the power converter 120 produces voltage 151 supplied to controller 140. The controller 140 uses the voltage 151 to control operation of the device 170 via control signal 106.

Note that the power converter 120 produces noise 103 via switching of a respective one or more switches in the power converter 120 to produce the voltage 151 supplied to controller 140 or other suitable entity.

The noise 103 originating from or caused by power converter 120 can take any suitable form. For example, in one embodiment, the power converter 120 and controller 140 are in close proximity and are connected to the same ground planes. In such an instance, operation of the power converter 120 results in coupling of noise 103 to the ground plane (voltage perturbations) and corresponding nearby circuitry such as controller 140, monitor 145, etc.

The circuitry associated with controller 140 such as the monitor 145 and corresponding sampling is susceptible to errors or imperfect readings due to presence of noise 103.

In addition or as an alternative to noise 103 affecting ground signals, note that the voltage 151 itself may include noise 103 originating from the power converter 120.

In yet further instances, the noise 103 may take the form of an emitted wireless signal that couples onto any of one or more of the circuit paths providing connectivity between different components of the power system 100. In a similar manner, in such an instance, the noise 103 introduces error to the samples 175 generated by the monitor 145.

Further in this nonlimiting example embodiment, the power source 160 provides voltage 161 (power) to the device 170. In one embodiment, the power source 160 powers the device 170 via voltage 161. As an alternative, note that the power converter 120 optionally supplies power (such as via voltage 151 or other suitable value) to the device 170 in lieu of or in addition to the supply of power from the power source 160.

As further discussed herein, it is noted that presence of the noise 103 is undesirable because it affects an accuracy of the monitor 145 producing respective samples 175 from feedback 171.

Figure 2:
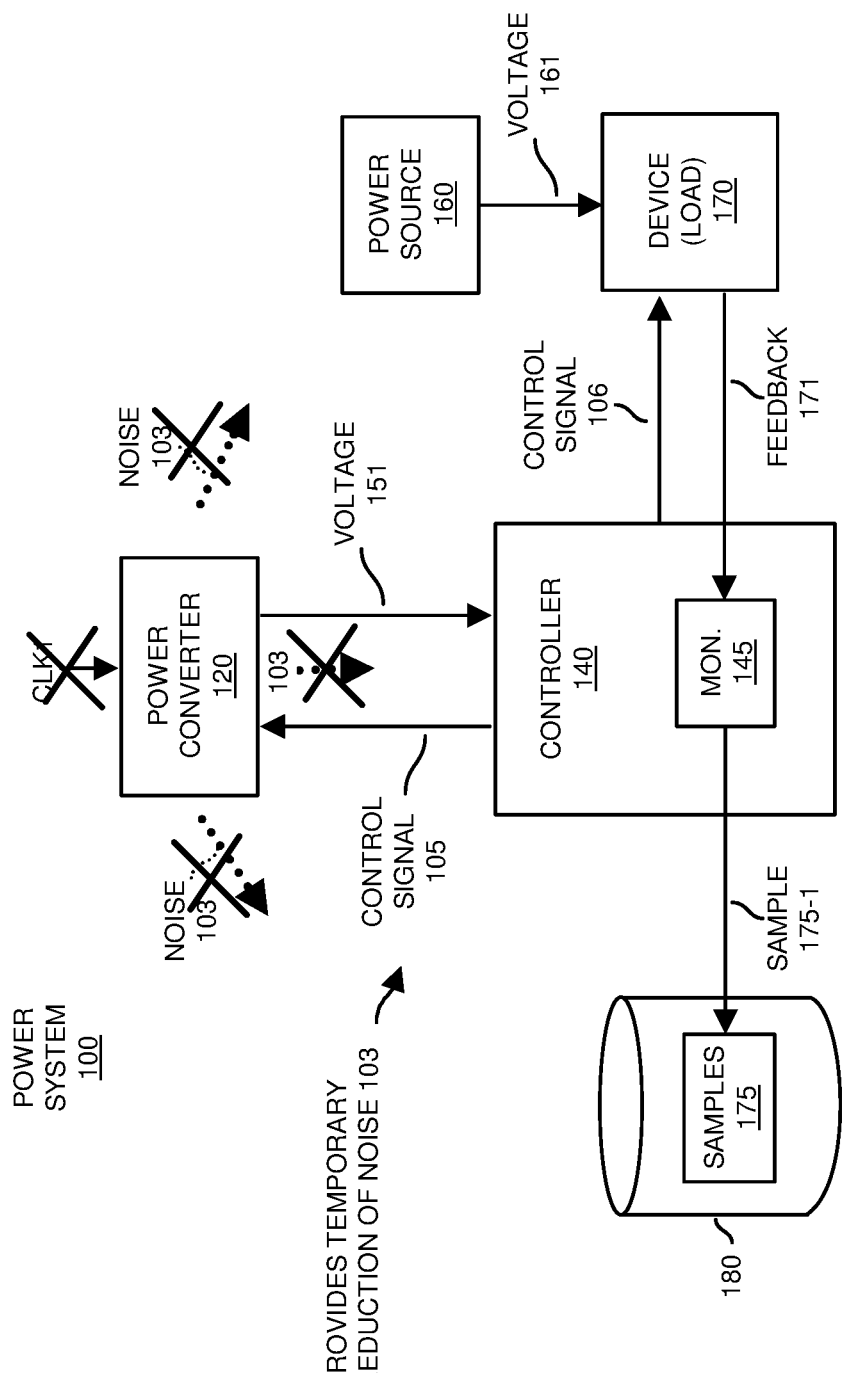
FIG. 2 is an example diagram illustrating noise reduction during one or more sample windows of time according to embodiments herein.

FIG. 2 is an example diagram illustrating noise reduction control during a sample window of time according to embodiments herein.

In this example embodiment, the controller 140 generates control signal 105 at or around a time such as in a window of time in which the monitor 145 performs a sampling of the feedback 171.

In one embodiment, the control signal 105 modifies an operation of the respective power converter 120 to reduce or eliminate noise 103 during the window of time. In such an instance, the temporary reduction in the noise 103 enables the monitor 145 to produce more accurate samples 175 of respective feedback 171.

Note that the device 170 can be any suitable type of hardware, software, etc. For example, in one non-limiting example embodiment, the device 170 can be a motor controlled by the controller 140. In such an instance, the feedback 171 represents an amount of current through one or more respective windings of the motor.

In furtherance of producing accurate samples 175 of corresponding current, the controller 140 produces control signal 105 to temporarily adjust operation of the power converter 120 to reduce or eliminate presence of noise 103.

Thus, in one embodiment, the feedback 171 can be configured to indicate a magnitude of current supplied by the power source 160 to the device 170. The controller 140 adjusts the operation of the power converter 120 (reducing noise 103) to produce more accurate samples 175 of the magnitude of current supplied by the power source 160 to the load (device 170). In one embodiment, the controller 140 and corresponding drivers are powered by one or more voltages received from the power converter 120.

Note that the device can be any suitable resource, hardware, etc. For example, in another embodiment, the device 170 is a sensor device (transducer) operable to monitor a particular parameter such as temperature, pressure, etc. In such an instance, the device 170 produces feedback 171 indicating a magnitude of a respective monitored parameter. In furtherance of producing accurate samples 175 of corresponding current, the controller 140 produces control signal 105 to temporarily adjust operation of the power converter 120 to reduce or eliminate presence of noise 103.

Figure 3:
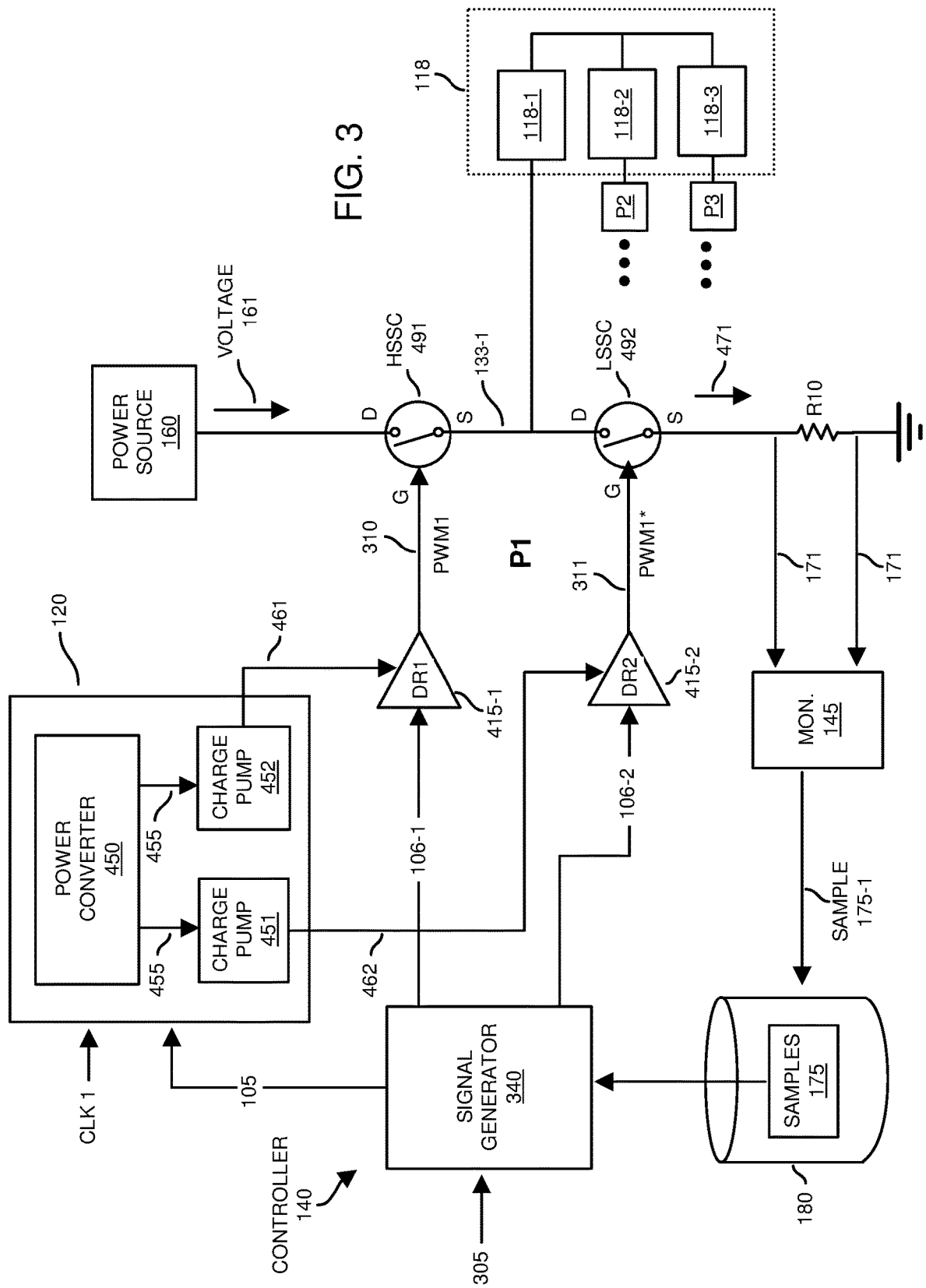
FIG. 3 is a more detailed example diagram illustrating implementation of control and sampling functions and respective circuitry according to embodiments herein.

FIG. 3 is an example diagram illustrating implementation of control and sampling functions according to embodiments herein.

In this example embodiment, the power converter 120 includes multiple power conversion resources (hardware) such as power converter 450, charge pump 451, charge pump 452, etc., generating one or more voltages 455, 461, 462, etc.

Further in this example embodiment, the controller 140 includes signal generator 340 as well as multiple phase drivers P1, P2, and P3 that drive respective windings 118-1, 118-2, and 118-3 associated with load 118. Thus, in one embodiment, each of the phase drivers P1, P2, and P3 drives a respective motor winding of load 118 (a.k.a., device 170).

As further shown, the power converter 450 produces respective output voltage 455 (such as from a received input voltage). The power converter 450 supplies the generated output voltage 455 to each of charge pump 451 and charge pump 452. Alternatively, the power converter 450 generates different voltages supplied to the charge pumps 451 and 452.

Based on received voltage 455, the charge pump 451 generates respective output voltage 461 supplied to the driver 415-1 of phase driver P1. Similarly, based on the received voltage 455 (or other suitable voltage generated by the power converter 450), the charge pump 452 generates respective output voltage 462 supplied to the driver 415-2 of phase driver P1.

In this example embodiment, the controller 140 such as instantiated as a circuit further includes signal generator 340.

In one embodiment, the signal generator 340 receives control setting 305 indicating how to control current provided to winding 118-1 of the load 118 via phase P1. The controller 140 and corresponding monitor 145 determines an amount of current supplied to a winding of the load 118 based on monitoring a respective voltage (feedback 171 such as a single or differential voltage) provided by resistor R10.

More specifically, in a first portion of a respective control cycle, the signal generator 340 generates the signal 106-1 supplied to driver 415-1. Driver 415-1 produces control signal 310 that drives high side switch circuitry 491 to an ON-state. While the high side switch circuitry 491 is in an ON state, the low side switch circuitry 492 is controlled to an OFF state based on the input 311 provided by the driver 415-2.

In a second portion of a respective control cycle, the signal generator 340 generates the signal 106-1 supplied to driver 415-1 to be a logic low signal. Driver 415-1 produces control signal 310 that drives high side switch circuitry 491 to an OFF state. While the high side switch circuitry 491 is in an OFF state, the low side switch circuitry 492 is controlled to an ON state based on the input 311 provided by the driver 415-2.

As previously discussed, the monitor 145 receives feedback 171 such as indicating an amount of current through a respective winding of the load 118 and produces samples 175 stored in repository 180.

In one embodiment, the signal generator 340 compares the samples 175 to a control setting 305. The signal generator 340 varies a respective pulse with of generating corresponding control signals 106-1 and 106-2 to supply the appropriate amount of current to the load 118 via each of the phases P1, P2, P3 as specified by the control setting 305.

For example, if the detected current supplied (as indicated by samples 175) is less than the setpoint 305, the signal generator 340 increases a pulse width modulation duty cycle of operating high side switch circuitry 491 in a control cycle; if the detected current supplied (as indicated by samples 175) is greater than the setpoint 305, the signal generator 340 decreases a pulse width modulation duty cycle of operating high side switch circuitry 491 in a control cycle.

As further discussed below, the controller 140 can be configured to adjust operation of the power converter 120 in any suitable manner. For example, FIG. 4 below illustrates monitoring of the feedback signal 171 without modifying operation of the power converter 120. In such an instance, the samples 175 derived from the monitored feedback 171 include a substantial amount of noise caused by continued operation of the power converter 120.

FIGS. 5 through 8 below illustrate different techniques of adjusting operation of the respective power converter 120 (and one or more of power converter 450, charge pump 451, charge pump 452, etc.) during one or more windows of time to reduce the amount of noise associated with the feedback 171 and corresponding samples 175.

Figure 4:
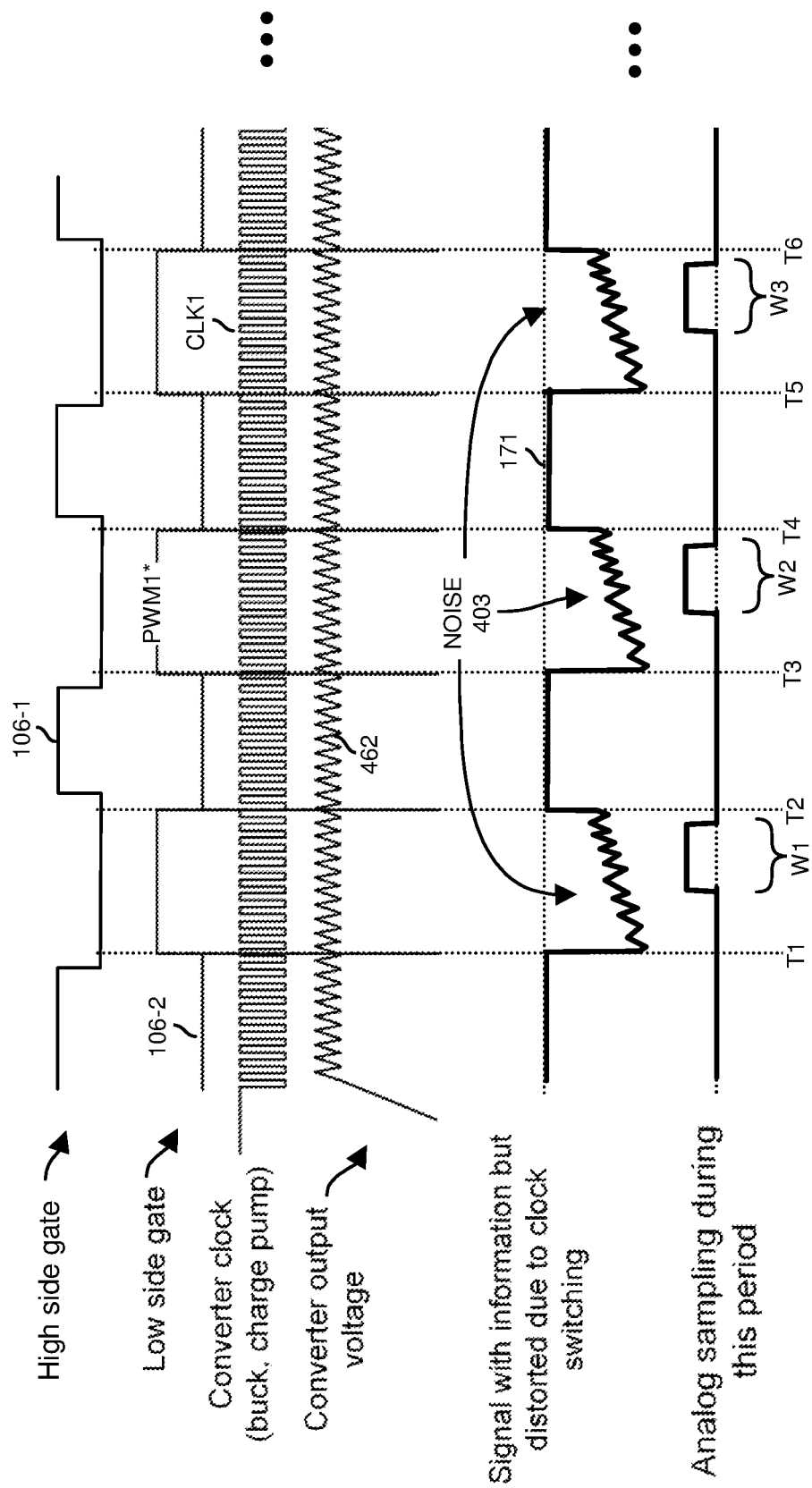
FIG. 4 is an example timing diagram illustrating feedback and sampling affected by noise according to embodiments herein.

FIG. 4 is an example timing diagram illustrating feedback affected by noise according to embodiments herein.

In this example embodiment, the controller 140 activates the low side switch circuitry 492 to an ON state between time T1 and time T2 via generation of the control signal 106-2 to a high state. The controller 140 deactivates the high side switch circuitry 491 to an OFF state between time T1 and time T2 via generation of the control signal 106-1 to a low state.

In such an instance, between time T1 and time T2, the corresponding feedback signal 171 generated by the sense resistor R10 includes unwanted noise 403. Thus, when the monitor 145 monitors the feedback 171 during the windows of time W1, W2, W3, etc., the samples 175 are inaccurate due to the presence of the noise 403 affecting the signal 171 and/or monitor 145 capturing the samples 175.

Figure 5:
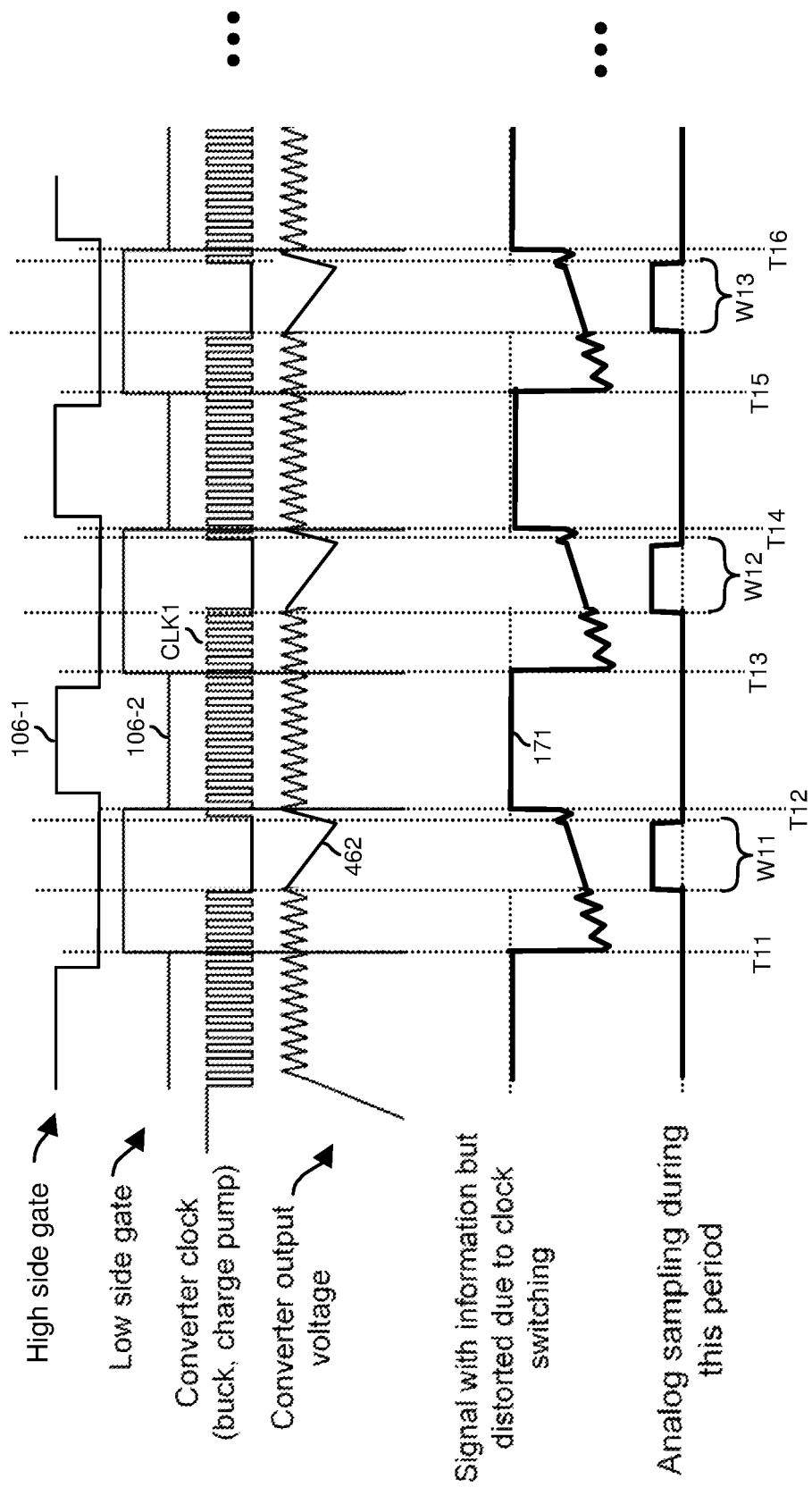
FIG. 5 is an example timing diagram illustrating temporary power converter adjustments and sampling of respective feedback according to embodiments herein.

FIG. 5 is an example timing diagram illustrating temporary power converter adjustments and sampling of respective feedback according to embodiments herein.

As previously discussed, the controller 140 is operative to receive feedback 171 associated with a device 170 (such as load 118) powered by a power source 160. The controller 140 controls delivery of power (such as current) from the power source 160 to the load 118.

In one embodiment, as an alternative to the power source 160 powering the respective load 118, the power converter 120 converts an input voltage and supplies corresponding generated one or more voltages to power the load 118.

Also, as previously discussed, note again that derivation of samples from the feedback 171 is susceptible to errors for any number of reasons. For example, as previously discussed, noise 103 from the power converter 120 may itself couple onto the feedback 171 via spikes in the ground voltage, noise 103 from the power converter 120 may itself couple onto the feedback 171 via spikes in the supply voltages, a monitor 145 that samples the feedback may be susceptible to noise from the power converter 120, etc.

In furtherance of reducing noise associated with monitoring the feedback 171 (such as a single voltage or differential voltage from sense resistor R10 or other suitable entity), the controller 140 adjusts operation of the power converter 120 during a window of time W11 in which the power source 160 powers the device 170.

For example, the adjusted operation of the power converter 120 during the window of time W11 as shown in FIG. 5 temporarily reduces noise 103 associated with the sampling of feedback 171 caused by the power converter 120 even though the power converter 120 still provides holdup power (such as voltages 455, 461, 462) to the drivers 415 during the outage. More specifically, during the window of time W11 in which the operation of the power converter 120 is adjusted to reduce noise via discontinued clocking of clock CLK1 and switching in power converter 120 as shown, the controller 140 (or corresponding, monitor, sampler, etc., associated with the controller) derives or produces one or more samples values 175 from the feedback 171. The signal 170 is clean of noise during window of time W11 because the clock CLK1 is disabled and one or more power converters are disabled.

In one embodiment, the power converter 450 is a buck converter including at least a high-side switch (synchronous switch) and a high-side switch (control switch) that are switched ON and OFF at different times via clock CLK1 to produce the respective output voltage 151.

Thus, in one embodiment, as previously discussed, the power converter 120 includes one or more switching power supplies. The controller 140 generates a control signal 105 at appropriate windows of time (W11, W12, W13, etc.) to control the power converter 120. In one embodiment, the control signal 105 indicates to temporarily discontinue switching operation of the power converter 120 during windows of time W11, W12, W13, etc.

The noiseless feedback 171 from the device 170 indicates a parameter such as an amount of current supplied by the power source 160 to the device 170 (such as motor, circuit, etc.), although feedback 171 can be information associated with any suitable monitored parameter.

In one embodiment, the power converter 120 supplies power to the switch drivers 415 controlled by the controller 140. Via controlling operation of the switch drivers 415, the controller 140 controls delivery of the current from the power source 160 to the load 118 and corresponding windings 118-1, 118-2, and 118-3 via one or more switches 491 and 492 driven by the switch drivers 415.

In this example embodiment, the control signal 105 disables the operation of the power converter 450 such that the output voltage 462 supplied to drivers 415 starts to drop (decrease) at the beginning of a respective window of time. Note that the power converter 450 and corresponding charge pumps 451 and 452 include appropriate capacitors to temporarily maintain output voltage 455 and output voltages 461 and 462 above a threshold value during the windows of time W11, W12, W13, etc., although the voltage 462 supplied to the driver 451-2 steadily decreases in each of the windows of time.

The temporary adjustment of the power converter 120 (such as discontinued switching of respective high-side switch and low-side switch of a buck converter and switching of charge pumps) during the windows of time (when sampling takes place) reduces an amount of the noise 103 in the sample values 175 caused by the power converter 120.

As further shown, further embodiments herein include operation of the power converter 120 outside the window of time W11 between the time T11 and time T12. In such an instance, the operation of the power converter 120 and corresponding switching introduces noise in the feedback associated with the device 170. In one embodiment, no samples are taken outside the window of time.

Figure 6:
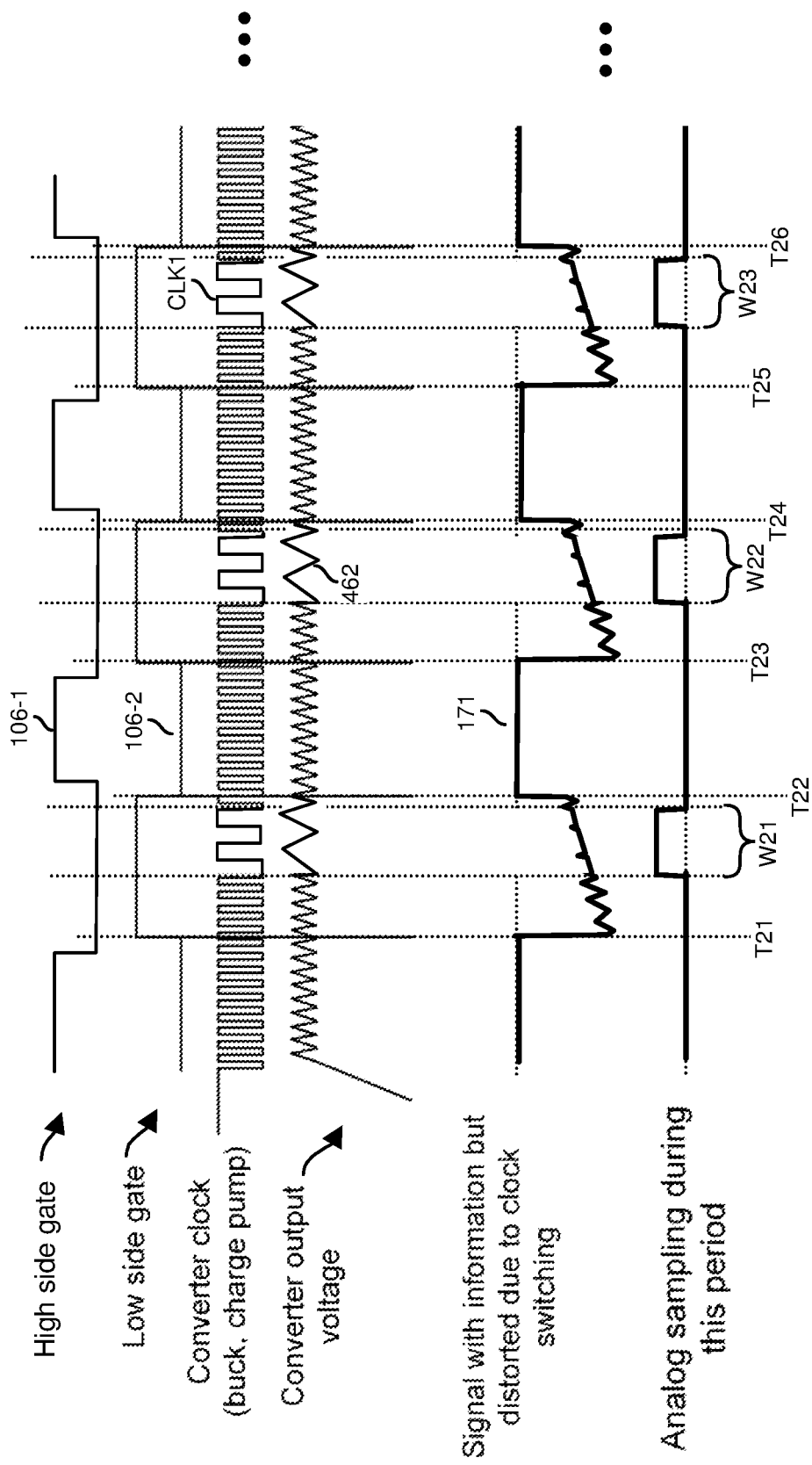
FIG. 6 is an example timing diagram illustrating temporary power converter adjustments and sampling of respective feedback according to embodiments herein.

FIG. 6 is an example timing diagram illustrating temporary power converter adjustments and sampling of respective feedback according to embodiments herein.

In this embodiment, the controller 140 communicates the control signal 105 to the power converter 120 in a similar manner as previously discussed. However, in this instance, the control signal 105 indicates to temporarily modify a switching frequency of the power conversion (associated with clock CLK1 and power conversion) during each of the windows of time.

For example, outside each of the windows of time W21, W22, W23, etc., the controller 140 controls the frequency of the clock CLK1 to be a first switching frequency such as 400 KHZ; inside the windows of time W21, W22, W23, etc., the controller 140 controls the frequency of the clock CLK1 to be a first switching frequency such as 100 KHZ. The pulse width duration remains the same inside and outside of windows although this can vary.

The lower frequency of switching the power converters during the windows of time W21, W22, W23, etc., reduces an amount of noise coupling onto the samples 175 derived from the feedback 171. Switching operation in the windows of time ensures that the voltage 462 does network of the drop below a threshold value.

Thus, in one embodiment, modification of the switching frequency CLK1 during each of the windows of time at least temporarily reduces an amount of noise originating from the power converter 120 during a respective sample window of time W21, W22, W23, etc., in which the feedback 171 is converted into one or more sample values 175.

Figure 7:
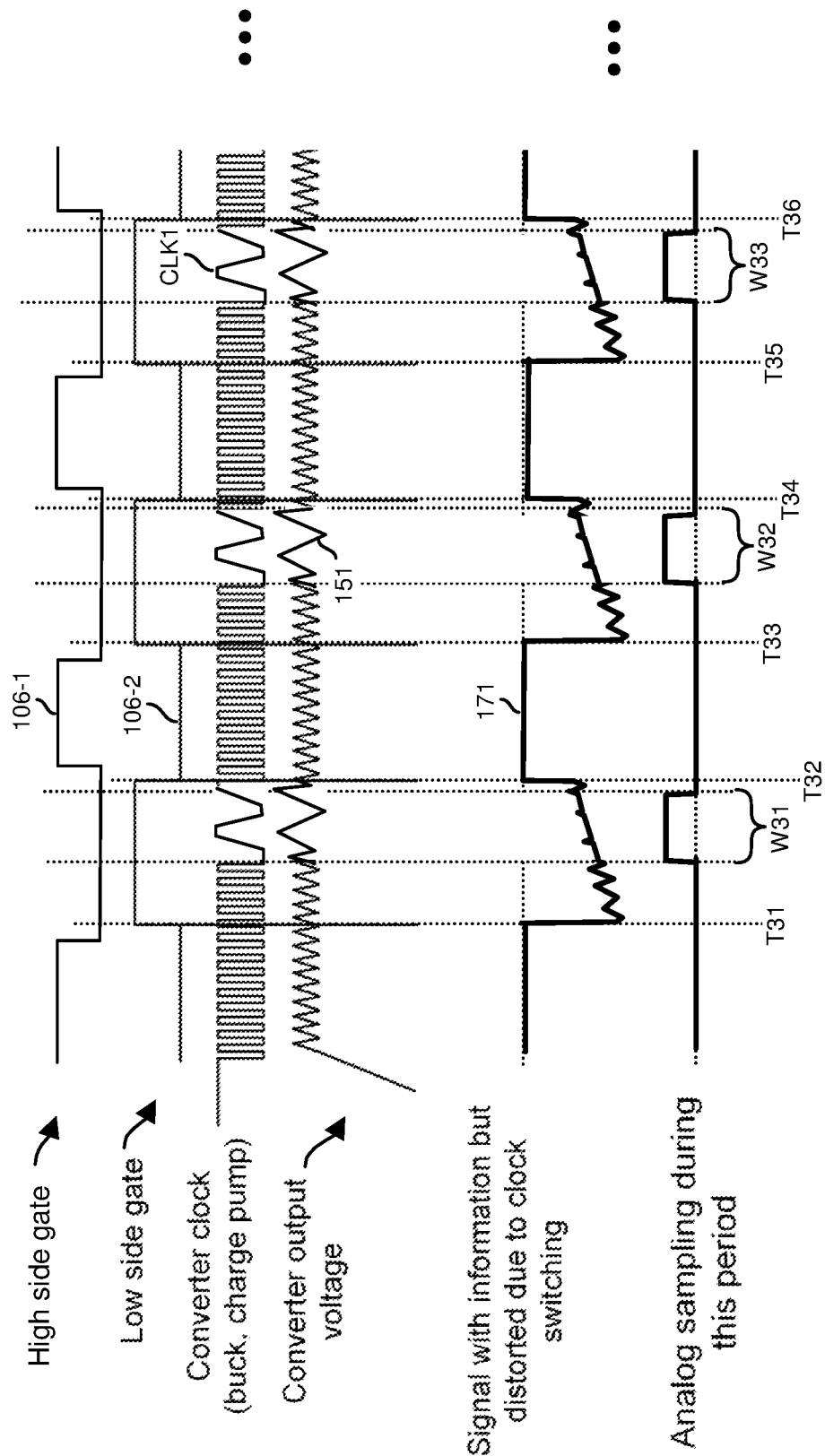
FIG. 7 is an example timing diagram illustrating temporary power converter adjustments and sampling of respective feedback according to embodiments herein.

FIG. 7 is an example timing diagram illustrating temporary power converter adjustments and sampling of respective feedback according to embodiments herein.

Further embodiments herein include, via the controller 140, during each of the windows of time W31, W32, W33, etc., the controller 140 or other suitable entity controls a slew rate of switch control signals (CLK1) used to perform power conversion via the power converter 120. In one embodiment, the controller 140 controls the slew rate of switching as well as a switching frequency during the windows of time.

Thus, in this example embodiment, in some respects, the controller 140 communicates the control signal 105 to the power converter 120 in a similar manner as previously discussed. However, in this instance, the control signal 105 indicates to temporarily modify a switching frequency of the power conversion (associated with clock CLK1 and power conversion) during each of the windows of time W31, W32, W33, etc. The controller 140 also indicates (via control communications) to reduce a respective slew rate of clock CLK1 as shown.

In such an instance, outside each of the windows of time W31, W32, W33, etc., the controller 140 controls the frequency of the clock CLK1 to be a first switching frequency such as 400 KHZ; the controller 140 controls the frequency of the clock CLK1 to be a first switching frequency such as 100 KHZ. The controller 140 reduces the slew (rate at which the clock signal CLK1 takes to rise from a logic low to logic high or drop from a logic high to a logic state) in each of the windows of time. The lower frequency of switching the power converters during the windows of time W31, W32, W33, etc., reduces an amount of noise coupling onto the samples 175 derived from the feedback 171.

Thus, in one embodiment, modification of the switching frequency CLK1 during each of the windows of time at least temporarily reduces an amount of noise originating from the power converter 120 during a respective sample window of time W31, W32, W33, etc., in which the feedback 171 is converted into one or more sample values.

Figure 8:
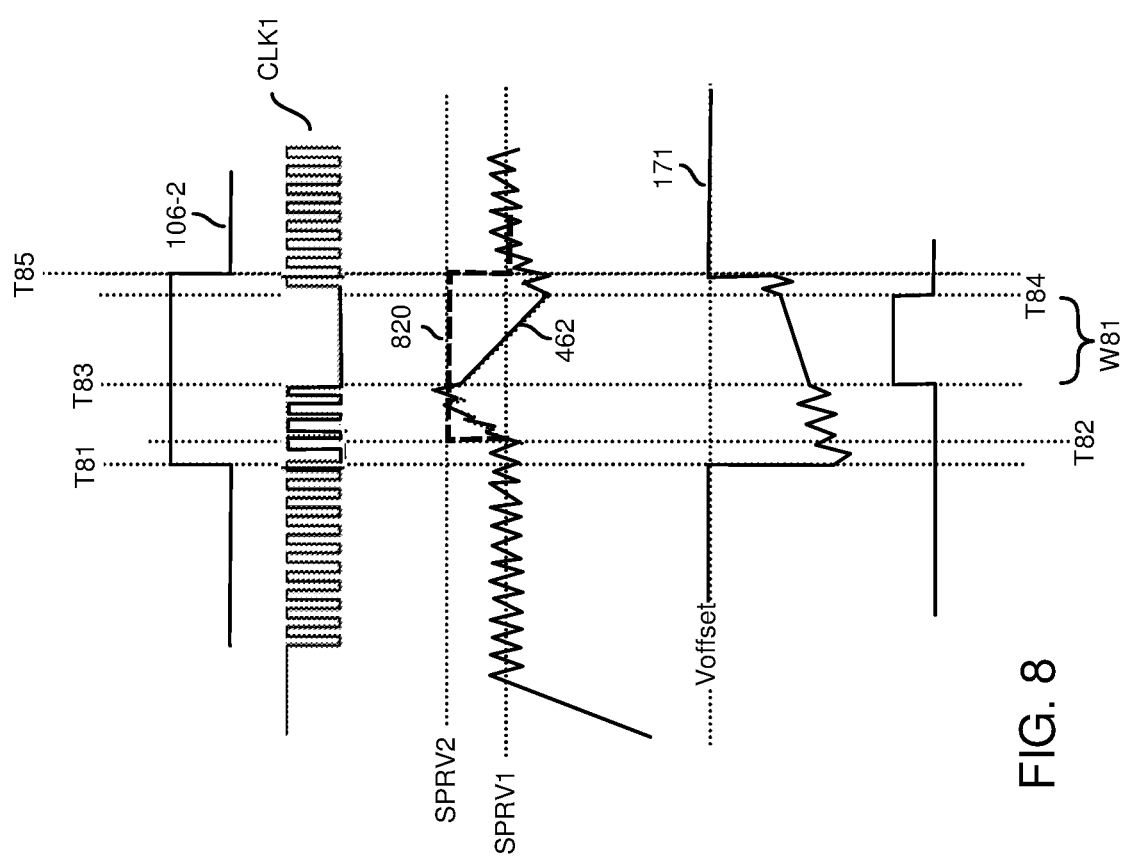
FIG. 8 is an example timing diagram illustrating temporary setpoint voltage adjustments and sampling of respective feedback according to embodiments herein.

FIG. 8 is an example timing diagram illustrating temporary setpoint voltage adjustments and sampling of respective feedback according to embodiments herein.

Further embodiments herein include mitigating the negative impact of the power converter 120 being switched to an OFF state during a window of time. For example, in one embodiment, the system designer knows how long it takes from activation of the low side switch circuitry 492 via the PWM signal until current is present in the sensor R10 (or other suitable entity) for sampling. In that time, the reference regulation setpoint for the power converter 120 can be artificially increased to a programmable value. After the sampling period arrives according to the controller, the clock is gated and the output of converter typically will drop. However, because of the overcharging condition of increased setpoint voltage, the drop in voltage will be less than in normal conditions, relaxing the recharge after clock gating and also ensuring average voltage is better regulated. In some cases, this can avoid an UVLO (Under Voltage Low condition) of the converter.

Thus, in still further example embodiments, the controller 140 temporarily adjusts a setpoint regulation voltage of the power converter during each of the windows of time. For example, in one embodiment, as shown at time T82, the controller 140 increases a magnitude of a regulation reference setpoint voltage of the power converter 120 prior to operating a sampler/monitor 145 that produces the one or more sample values 175 from the feedback 171.

More specifically, prior to time T82 and after T85, the controller 140 sets the reference voltage to value SPRV1. In such an instance, the output voltage 462 produced by the power converter 120 is around the value SPRV1. At or about time T82, the controller 140 increases a magnitude of the setpoint reference voltage to be value SPRV2. Thus, because the setpoint voltage controls regulation, the magnitude of the voltage 462 increases to the value SPRV2 between time T82 and time T83. The increased magnitude of the regulation reference setpoint voltage to SPRV2 temporarily increases a corresponding magnitude of the output voltage 462 produced by the power converter 120 in an anticipation that the power converter 120 will be temporarily deactivated during the window of time W81.

During the window of time W81 (time T83 to time T84), the controller 140 generates the control signal 105 which causes the power converter 120 to temporarily discontinue power conversion/switching operations. The temporary cessation of the switching and corresponding power conversion via the power converter 120 reduces the effect of noise 103 originated by the power converter on the feedback 171 and corresponding samples 175. In other words, the feedback signal 171 and corresponding generated samples 175 are free from noise 103.

Figure 9:
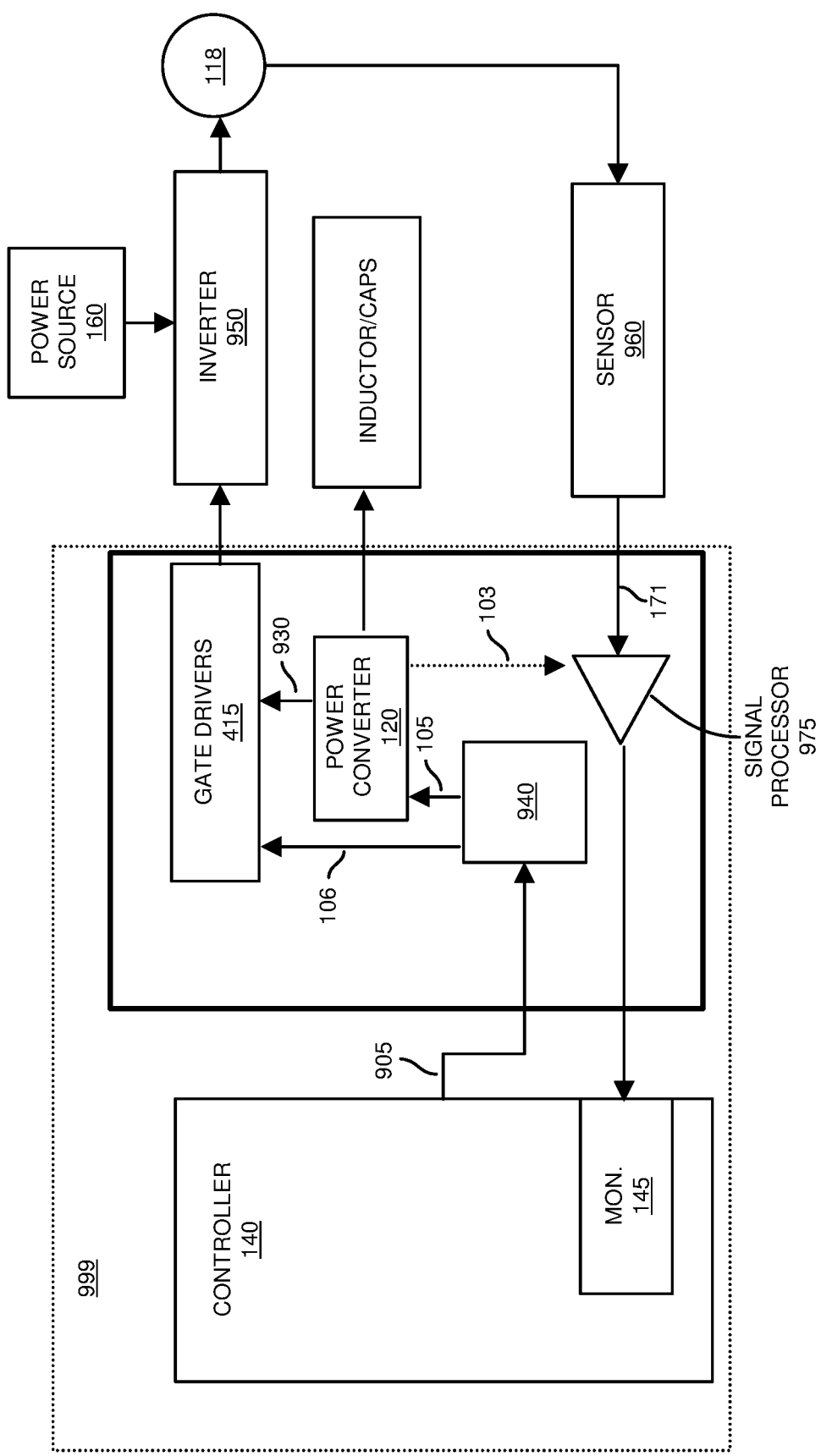
FIG. 9 is an example diagram illustrating a power system according to embodiments herein.

FIG. 9 is an example diagram illustrating a power system according to embodiments herein.

In this example embodiment, the management resource 940 receives gate control signal 905 (such as a pulse width modulation signal) generated by the controller 140. The management resource 940 generates controls signals 106 and 105 from the gate control signal 905. In one embodiment, a respective user is able to define or program delays between signal 905 and control signals 105 and 106.

More specifically, based on the signal 905, the management resource 940 determines when to deactivate the power converter 120. Power converter 120 supplies power 930 (such as voltages 461 and 462) to the drivers 415. Deactivation of the power converter 120 reduces or eliminates noise 103, enabling the signal processor 975 (such as an amplifier) and corresponding monitor 145 to convert the received feedback signal 171 from sensor 960 (such as resistor R10) into respective samples 175. In this case, the gating signal is internal to the device or simply is extracted directly from the signal 905 (such as PWM signal) after some programmable delay in contrast to another device providing the gating information externally. Delays refer to propagation delay of signals like PWM and MOSFET switch on.

Thus, in accordance with further example embodiments, the controller 140 produces a switch control signal 905 to control respective one or more switches in the inverter 950. A state of the switches control delivery of the current from a power source 160 to the load 118. In this example embodiment, via management resource 940, the switch control signal 905 itself is used to determine the window of time (as defined by control signal 105) modifying a behavior of the power converter 120 in any way as described herein.

As further shown, note that the components such as controller 140, monitor 145, gate drivers 415, power converter 120, management resource 940, signal processor 975, etc., are disposed in an integrated circuit 999. Alternatively, the components as shown FIG. 9 are individual components.

As previously discussed, embodiments herein are useful over conventional techniques. For example, embodiments herein include adjusting operation of a respective power converter in any of multiple different ways to at least temporarily reduce noise 103 originating from the power converter 120. The reduction in noise 103 enables a respective monitor/sampler 145 to obtain a more accurate reading of sample value from received feedback 171. For example, embodiments herein include selective disabling or altering of the switching of the noise source (converter clock for example) in a way that when the sensing circuitry is needed, the feedback signal is clean. However, the power conversion is selectively adjusted such that the power converter generally performs the desired function of providing power to components of the power system 100 but provides a window of reduced noise from the power converter 120 to generate one or more noise free samples 175.

Figure 10:
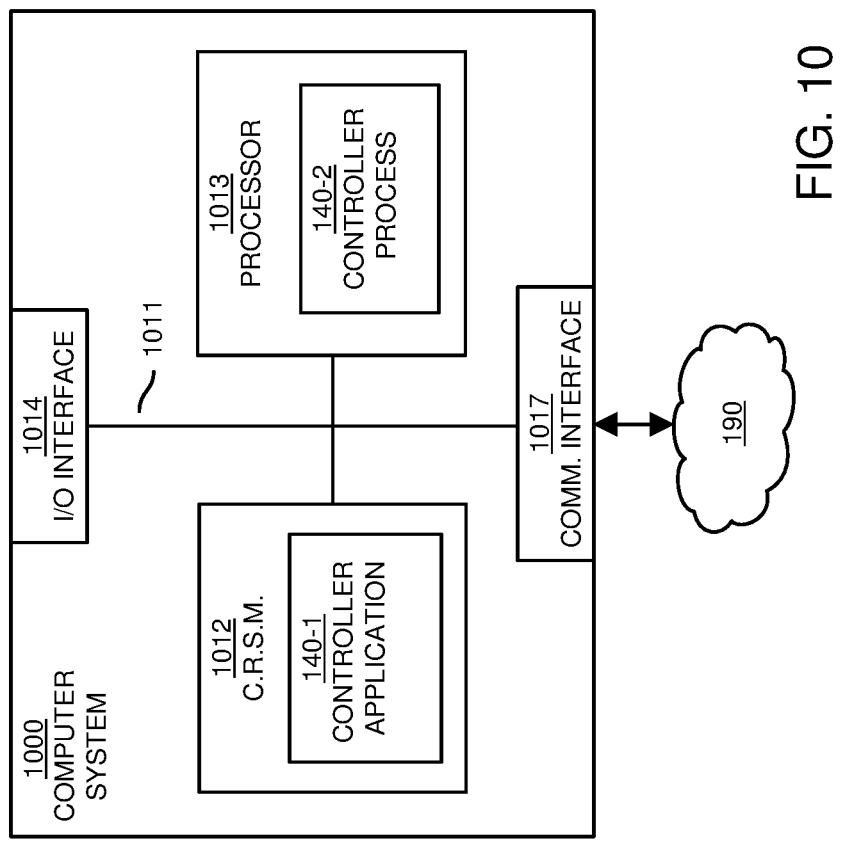
FIG. 10 is an example diagram illustrating computer processor hardware and related software instructions that execute methods according to embodiments herein.

FIG. 10 is an example block diagram of a computer device for implementing any of the operations as discussed herein according to embodiments herein.

As shown, computer system 1000 (such as implemented by any of one or more resources such as controller 140, monitor 145, power converter 120, etc.) of the present example includes an interconnect 1011 that couples computer readable storage media 1012 such as a non-transitory type of media (or hardware storage media) in which digital information can be stored and retrieved, a processor 1013 (e.g., computer processor hardware such as one or more processor devices), I/O interface 1014, and a communications interface 1017.

I/O interface 1014 provides connectivity to any suitable circuitry such as power voltage converter 165.

Computer readable storage medium 1012 can be any hardware storage resource or device such as memory, optical storage, hard drive, floppy disk, etc. In one embodiment, the computer readable storage medium 1012 stores instructions and/or data used by the controller application 140-1 to perform any of the operations as described herein.

Further in this example embodiment, communications interface 1017 enables the computer system 1000 and processor 1013 to communicate over a resource such as network 190 to retrieve information from remote sources and communicate with other computers.

As shown, computer readable storage media 1012 is encoded with controller application 140-1 (e.g., software, firmware, etc.) executed by processor 1013. Controller application 140-1 can be configured to include instructions to implement any of the operations as discussed herein.

During operation of one embodiment, processor 1013 accesses computer readable storage media 1012 via the use of interconnect 1011 in order to launch, run, execute, interpret or otherwise perform the instructions in controller application 140-1 stored on computer readable storage medium 1012.

Execution of the controller application 140-1 produces processing functionality such as controller process 140-2 in processor 1013. In other words, the controller process 140-2 associated with processor 1013 represents one or more aspects of executing controller application 140-1 within or upon the processor 1013 in the computer system 1000.

In accordance with different embodiments, note that computer system 1000 can be a micro-controller device, logic, hardware processor, hybrid analog/digital circuitry, etc., configured to control a power supply and perform any of the operations as described herein.

Functionality supported by the different resources will now be discussed via flowchart in FIG. 11. Note that the steps in the flowcharts below can be executed in any suitable order.

Figure 11:
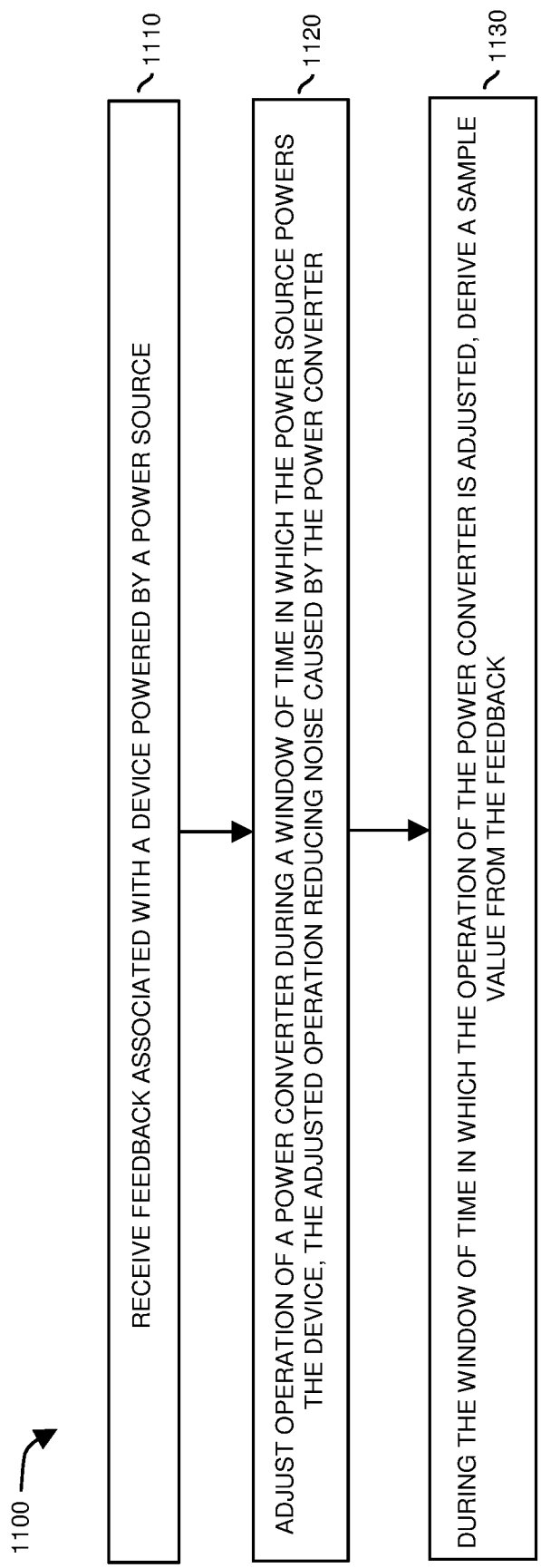
FIG. 11 is an example diagram illustrating a method according to embodiments herein.

FIG. 11 is an example diagram illustrating a method of controlling a power converter according to embodiments herein.

In processing operation 1110, the controller 140 receives feedback 171 associated with a device 170 (such as load 118) powered by a power source 160.

In processing operation 1120, the controller 140 adjusts operation of the power converter 120 during a window of time in which the power source 160 powers the device 170 (such as a load 118). The adjusted operation (any techniques as described herein) reduces or eliminates noise 103 caused by the power converter 120.

In processing operation 1130, during the window of time in which the operation of the power converter is adjusted, the monitor (sampler) derives a sample value from the feedback 171.

Figure 12:
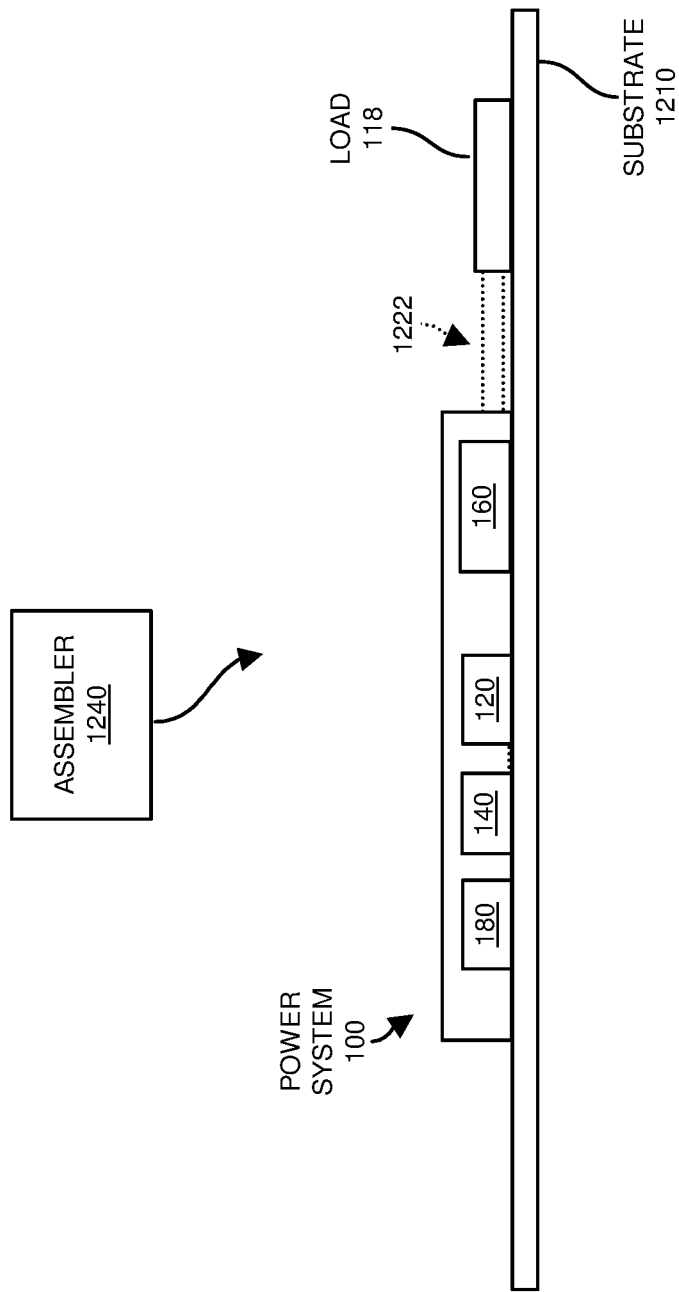
FIG. 12 is an example diagram illustrating assembly of a circuit according to embodiments herein.

FIG. 12 is an example diagram illustrating assembly of a power converter circuit (as including one or more power converters) on a circuit board according to embodiments herein.

In this example embodiment, assembler 1240 receives a substrate 1010 and corresponding components of power system 100 such as one or more of repository 180, controller 140, power converter 120, power source 160, etc. The assembler 1040 affixes (couples) the controller 140 and other components such as a repository 180, controller 140, power converter 120, power source 160, etc., to the substrate 1210.

Via respective circuit paths as described herein, the fabricator 1240 provides connectivity between the power converter 120, controller 140, etc. Note that components such as the controller 140, power converter 120, monitor 145, load 118, etc., can be affixed or coupled to the substrate 1210 in any suitable manner. For example, one or more of the components in power system 100 can be soldered to the substrate 1210, inserted into sockets disposed on the substrate 1210, etc.

Note further that the substrate 1210 is optional. Any of one or more circuit paths or connectivity as shown in the FIGS. and as described herein can be disposed in cables or other suitable medium.

In one nonlimiting example embodiment, the load 118 is disposed on its own substrate independent of substrate 1210; the substrate of the load 118 is directly or indirectly connected to the substrate 1210 via wires, cables, links, etc. The controller 140 or any portion of the power converter 120 can be disposed on a standalone smaller board plugged into a socket of the substrate 1210 as well.

Via one or more circuit paths 1222 (such as one or more traces, cables, connectors, wires, conductors, electrically conductive paths, etc.), the assembler 1240 couples the power system 100 and corresponding components to the load 118. In one embodiment, the circuit path 1222 conveys the power from power source 160 to the load 118.

Accordingly, embodiments herein include a system comprising: a substrate 1210 (such as a circuit board, standalone board, mother board, standalone board destined to be coupled to a mother board, host, etc.); a power system 100 including corresponding components as described herein; and a load 118 (such as a motor, winding, etc.).

Note again that techniques herein are well suited for use in circuit applications such as those that implement feedback monitoring. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
  a controller operative to:
    receive feedback associated with a device, the device being a load powered by a power source;
    adjust a switching frequency operation of a power converter to a non-zero switching frequency during a window of time of producing an accurate sample value of the feedback, the adjusted switching frequency operation of the power converter during the window of time operative to reduce noise caused by switching of the power converter; and
    during the window of time in which the switching frequency operation of the power converter is adjusted to the non-zero switching frequency, derive the sample value from the feedback; and
    temporarily increase a magnitude of a regulation reference setpoint voltage of the power converter prior to operating a sampler producing the sample value from the feedback, the increased magnitude of the regulation reference setpoint voltage increasing a corresponding magnitude of an output voltage produced by the power converter.

2. The apparatus as in claim 1, wherein the power converter is a switching power supply; and
  wherein the controller is further operative to: generate a control signal to control the power converter, the control signal indicating to temporarily reduce switching of the power converter during a less-than-all portion of the window of time.

3. The apparatus as in claim 1, wherein the feedback indicates a magnitude of current supplied by the power source to the device; and
  wherein the power converter supplies power to a switch driver that controls delivery of the current from the power source to the device via switch.

4. The apparatus as in claim 3, wherein the device is a multi-winding motor through which current from the power source passes.

5. The apparatus as in claim 1, wherein the controller is further operative to:
  during the window of time, adjust a slew rate of switch control signals used to perform power conversion via the power converter, the switch control signals operative to control switches in the power converter.

6. The apparatus as in claim 1, wherein the controller is further operative to:
  generate a control signal, the control signal operative to control the power converter during the window of time, the control signal adjusting power conversion switching operations of the power converter during the window of time.

7. The apparatus as in claim 1, wherein operation of the power converter outside the window of time introduces noise in the feedback associated with the device; and
  wherein the adjusted operation of the power converter conversion during the window of time reduces presence of the noise in the feedback.

8. The apparatus as in claim 1, wherein the controller is further operative to: produce a switch control signal to control a switch, a state of the switch controlling delivery of current from the power source to the device.

9. A system comprising:
  a circuit substrate;
  the apparatus of claim 1, the apparatus coupled to the circuit substrate; and
  wherein the load is coupled to the circuit substrate.

10. A method comprising:
  receiving a circuit substrate; and
  coupling the apparatus of claim 1 to the circuit substrate.

11. The apparatus as in claim 1, wherein the power converter is operative to produce a supply voltage supplied to power driver circuitry, the power driver circuitry operative to control delivery of current from the power source to the load through a set of switches controlled by the driver circuitry.

12. The apparatus as in claim 11, wherein the controller is operative to output driver control signals to the driver circuitry, the driver control signals operative to control the set of switches.

13. The apparatus as in claim 12, wherein the set of switches includes a first switch and a second switch disposed in series between the power source and a reference voltage, a node connecting the first switch and the second switch supplying current to power the load.

14. The apparatus as in claim 1,
  wherein the controller is operative to adjust switching of the power converter during the window of time in which a first switch conveying current from the power source to the device is set to an ON state for an entire duration of the window of time.

15. The apparatus as in claim 1, wherein the controller is operative to switch the power converter at a higher switching frequency than switching of driver circuitry controlling delivery of current from the power source to the load; and
wherein the power converter produces the output voltage to power the driver circuitry during the window of time.

16. The apparatus as in claim 1, wherein the adjusted switching frequency operation of the power converter results in a decrease in magnitude of a supply voltage produced by the power converter during the window of time.

17. The apparatus as in claim 16, wherein the output voltage powers a switch driver that controls delivery of current from the power source to the device via control of a respective switch.

18. The apparatus as in claim 1, wherein the power converter is operative to generate the output voltage to power switch driver control circuitry during the window of time, the switch driver control circuitry operative to control switches and delivery of current through the switches to the device.

19. The apparatus as in claim 18, wherein the adjusted switching frequency operation includes adjustment of a slew rate of control signals applied to the power converter to generate the output voltage.

20. The apparatus as in claim 18, wherein the controller is further operative to: i) set the switching frequency operation of controlling the power converter to a first switching frequency magnitude prior to the window of time; and ii) set the switching frequency operation of controlling the power converter to a second switching frequency magnitude during the window of time, the second switching frequency magnitude being the non-zero switching frequency, the second switching frequency magnitude being less than the first switching frequency magnitude.

21. The apparatus as in claim 1, wherein the controller is further operative to vary a magnitude of the non-zero switching frequency during the window of time.

22. The apparatus as in claim 1, wherein the non-zero switching frequency is a clock signal applied to control operation of the power converter; and
wherein the adjusted switching frequency operation includes adjustment of a slew rate of the clock signal.

23. The apparatus as in claim 1, wherein the controller is further operative to:
i) set the non-zero switching frequency to a first switching frequency setting outside the window of time; and
ii) set the non-zero switching frequency to a second switching frequency setting during the window of time, the second switching frequency setting less than the first switching frequency setting.

24. The apparatus as in claim 23, wherein the controller is further operative to:
i) control the first switching frequency setting to have a first slew rate; and
ii) control the second switching frequency setting to have a second slew rate, the second slew rate less than the first slew rate.

25. A method comprising:
receiving feedback associated with a device powered by a power source;
temporarily adjusting a switching frequency operation of a power converter to a non-zero switching frequency during a window of time to sample the feedback, the adjusted switching frequency operation reducing noise caused by the power converter;
during the window of time in which the switching frequency operation of the power converter is adjusted, deriving a sample value from the feedback; and
temporarily increase a magnitude of a regulation reference setpoint voltage of the power converter prior to operating a sampler producing the sample value from the feedback, the increased magnitude of the regulation reference setpoint voltage increasing a corresponding magnitude of an output voltage produced by the power converter.

26. The method as in claim 25,
wherein the feedback indicates an amount of current supplied by the power source to the device; and
wherein the power converter supplies power to a switch driver that controls delivery of the current from the power source to the device via switch circuitry.

27. The method as in claim 25, wherein adjusting operation of the power converter includes:
during the window of time, controlling a slew rate of switch control signals used to perform power conversion via the power converter.

28. The method as in claim 25, wherein operation of the power converter outside the window of time introduces noise in the feedback; and
wherein the adjusted operation of the power converter during the window of time reduces presence of the noise in the feedback.

29. The method as in claim 25, wherein adjusting operation of the power converter during the window of time includes:
producing a switch control signal to control a switch, a state of the switch controlling delivery of current from the power source to the device.

30. The method as in claim 29 further comprising:
using the switch control signal to determine the window of time in which to adjust the operation of the power converter.

31. An apparatus comprising:
a controller operative to:
receive feedback associated with a device, the device being a load powered by a power source;
adjust a switching frequency operation of a power converter to a non-zero switching frequency during a window of time of producing an accurate sample value of the feedback, the adjusted switching frequency operation of the power converter during the window of time operative to reduce noise caused by switching of the power converter;
during the window of time in which the switching frequency operation of the power converter is adjusted to the non-zero switching frequency, derive the sample value from the feedback; and
wherein the power converter is operative to generate a supply voltage that powers switch driver control circuitry that controls operation of switches and delivery of current through the switches to the device; and wherein the controller is further operative to temporarily increase a magnitude of a regulation reference setpoint voltage used by the power converter to produce the supply voltage prior to producing the sample value from the feedback, the increased magnitude of the regulation reference setpoint voltage increasing a corresponding magnitude of the supply voltage produced by the power converter.

* * * * *